July 18, 1961 S. BURRITT, JR., ET AL 2,992,808
METERING VALVE
Filed Oct. 6, 1958
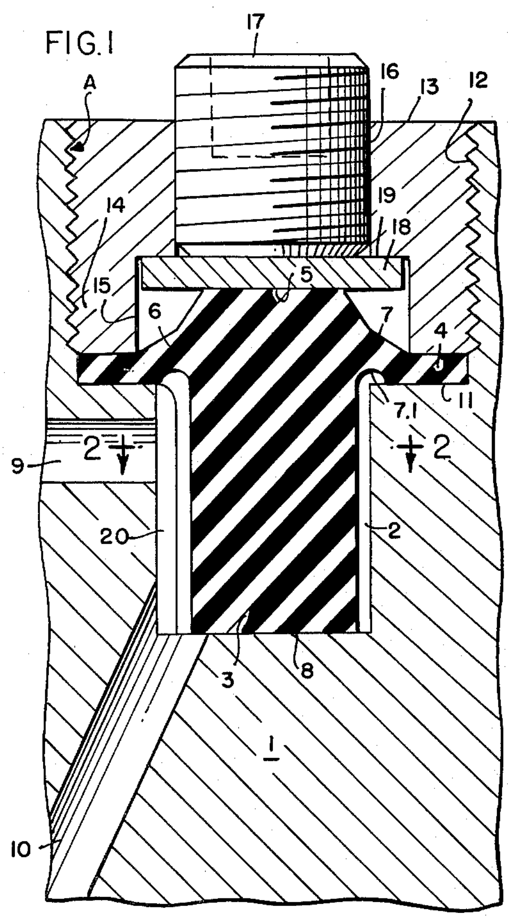
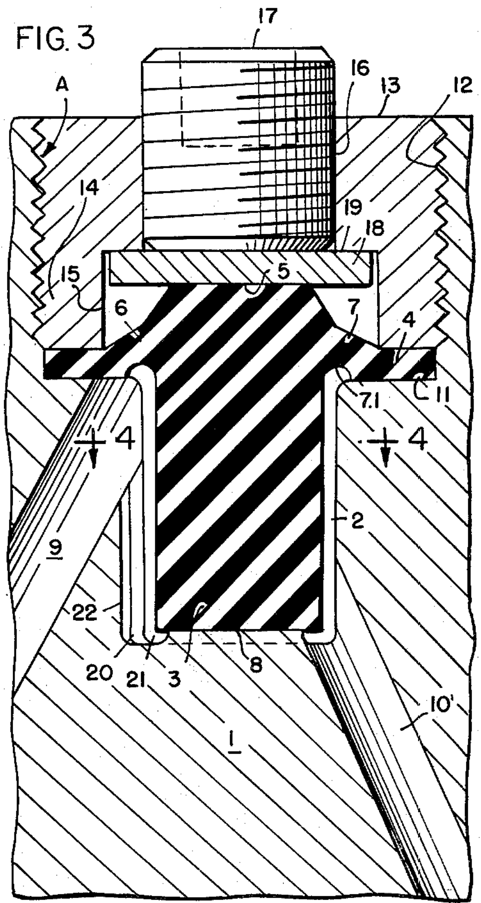
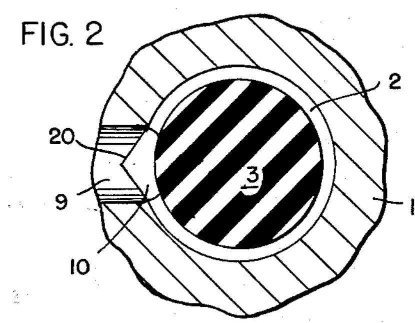
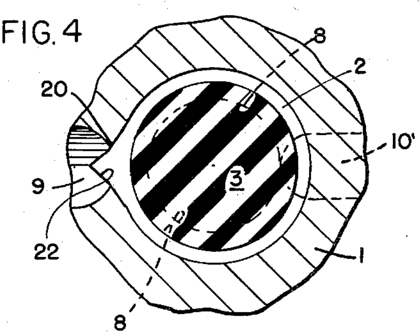
INVENTORS:
SILVIUS BURRITT JR.
HERMAN P. PICHLER
BY Rummler & Snow
ATT'YS

United States Patent Office 2,992,808

Patented July 18, 1961

1

2,992,808

METERING VALVE

Silvius Burritt, Jr., Bensenville, and Herman P. Pichler, Franklin Park, Ill., assignors, by mesne assignments, to The Oscar C. Rixson Co., Franklin Park, Ill., a corporation of Illinois Filed Oct. 6, 1958, Ser. No. 765,492
3 Claims. (Cl. 251—205)

This invention relates to metering valves and more particularly to metering valves for a fluid flow that is under considerable pressure as is encountered in the operation of spring actuated, hydraulically regulated, door closers.

Heretofore substantially all known hydraulically controlled door closers were bulky, unsightly objects that were attached to the doors, of necessity, in place of the old common everyday spring, to permit the door to be closed automatically in a gentle, smooth manner, without slamming. As is well known to those skilled in the art, the designers of these devices have sought to reduce their size and bulk. However, one handicap has been the structure required to provide an adjustable-speed valving arrangement for regulating the flow of the hydraulic fluids from one side of the dashpot piston to the other, and particularly the space required for the flow regulating valve, which of necessity must be externally accessible and capable of adjustment over a considerable range. The valves heretofore used required too much space for their placement and operation, and in most cases range of adjustability had to be sacrificed to minimize the size of the valve structure. Also, as door closer constructions have been reduced in size the internal fluid pressures required have been increased with the result that fine adjustment of flow by means of conventional valve structures has been difficult, if not impossible to obtain.

With this in mind, therefore, the principal objects of the present invention are to provide an improved plug type of metering valve capable of extremely fine adjustment while operating under considerable pressure of the order of about one hundred pounds per square inch; and to provide a valve of this type which can be mounted within a very limited space of axial depth.

Another object of this invention is to provide a screw actuated valve of this type which will be very short in its axial length and yet permit at least two or three full turns of the adjusting screw between the open and closed positions, thereby providing for very fine adjustment.

A still further object of this invention is to provide an improved valve of this kind for use in a new and more compact type of door closer, such as that disclosed in the co-pending application of David H. Ellis, Serial No. 781,565, filed December 19, 1958, wherein the housing walls are too thin and the space available too small to permit the use of the ordinary valve structures giving the necessary range of metering adjustment.

Specific embodiments of this invention are shown in the accompanying drawings in which:

FIGURE 1 is a sectional view in elevation of the improved valve.

FIG. 2 is a sectional view of the same as taken on line 2—2 of FIG. 1, showing the valve and a portion of an intersecting flow passage.

FIG. 3 is a sectional view of a modified arrangement of the improved valve; and

2

FIG. 4 is a plan view of the same on line 4—4 of FIG. 3.

Referring to the drawings, and more particularly to FIG. 1, there is shown, in cross-section, a portion of a door closer body, as at 1, that has been provided with an annular aperture, generally indicated at A, and a counterbored smaller diameter portion which is indicated at 2. The counterbore 2 is adapted to receive a flexible valving member 3, made of rubber or other similar material, which is of cylindrical form and of smaller diameter than the bore 2 and which is provided with a unitary annular flanged portion 4 intermediate its ends. The cylindrical body of the valving member 3, below the flanged portion 4, is of greater length than the depth of the counterbore 2 and is provided with a head portion 5, which projects axially above the flange 4, and is joined thereto by an annular web portion 6 of substantially the same thickness as the flange 4. The aforementioned head portion 5, as illustrated, is in the form of a truncated cone and its side wall is joined to the flange 4 by a frusto-conical area 7, which constitutes the outer surface of the web portion 6. Also, as shown, the web portion 6 is undercut as at 7.1 in the axial direction so as to maintain substantially the same thickness throughout the area of the flange and to provide greater flexibility in the web portion 6 for a purpose that will hereafter appear. Furthermore, it will be observed that the lower extremity of the valve body 3 is adapted to seat squarely on a flat base 8 at the bottom of the counterbore 2 for a reason that will become apparent as the description progresses. On the left side of FIG. 1 there is shown, also, two passageways 9 and 10 which communicate with the counterbore opening within which the valve body 3 is confined.

Above the counterbored cylindrically walled aperture portion 2 there is provided a radially extending, flat, annular shelf portion 11 that is adapted to receive the before-mentioned flange 4 of the valve body 3. Extending above the periphery of the said annular flange 4 is an internally threaded cylindrical wall 12, defining the main aperture A, which is adapted to receive the complementally threaded plug or body 13 which is provided with an annular depending collar 14 arranged to bear upon and confine the margin of the flange 4 of the valve body 3 against the radial shelf 11. The plug body 13, which may be of any suitable material, is provided with a recess portion 15 that extends axially thereof within the collar 14. The recessed portion is arranged as an inwardly opening bore in the lower face of the plug body 13 and communicates directly with an axially extending internally threaded counterbore 16 which opens to the outer end of the plug body and which is adapted to receive a set screw 17. As shown, an annular washer 18 is interposed between the head portion 5 of the valve body 3 and the set screw 17 and this washer is normally held against the shoulder 19, at the juncture of the recess 15 and the counterbore 16, by the inherent resiliency of the valve body 3.

It will now be apparent to those skilled in the art that axial compression of the cylindrical valve body 3 may be had by applying pressure axially upon the head portion 5 by turning the set screw 17 in the direction to drive it into the counterbore 16; and that such compression of the rubber valve body 3 will cause it to expand radially and uniformly throughout its length, below the flange 4, so as to reduce the width of the space between the body 3 and the wall of the counterbore 2. The flange 4 serves to seal off the counterbore 2 and the undercut 6 affords sufficient flexibility for the flange to permit axial compression of the valve body 3 without excessive strain or stretch at the juncture of the flange with the valve body. With reference to FIG. 1, it will be noted that the fluid flow ports 9 and 10 intersect the wall of the counterbore chamber 2, in which the valve 3 is confined, but do not intersect one another. As shown in FIG. 2, however, it will be noted that the vertically extending wall of the chamber 2 is provided with a longitudinally extending notch or groove 20 leading between the passages 9 and 10, to thereby permit a small amount of fluid flow between the passages 9 and 10 even though the bore 2 has become completely filled by the distended or compression-expanded body 3.

It can now be readily visualized, that by screwing the set screw 17 downwardly into the plug body 13, and thereby applying axial pressure to the head portion 5 through the washer 18, the valve body 3 will be axially compressed and radially distended to thereby restrict the surrounding space between the valve body 3 and the cylindrical wall of the counterbore 2. The variable distention of the valve 3, between its normal inert position shown in FIG. 1 and a condition where it fills the bore 2, will provide for minute adjustments of fluid flow between the passages 9 and 10. All of the fluid flow may be cut off by screwing down on the set screw 17 sufficiently to completely distend the valve body 3 so that it fills the longitudinal groove 20. However, under normal circumstances the groove 20 will remain open for passage of fluid at a fixed rate, depending upon the size or depth of the groove, so that some flow between the passages 9 and 10 will always be had.

With reference to FIG. 3, the structure of the valve therein shown is substantially the same as the valve shown in FIG. 1, and the numerals through 20 are identical, except that the fluid passages shown in FIG. 3 intersect the wall of the counterbore or chamber 2 at different angles from that shown in FIG. 1. Also, as shown in FIG. 3, the modified form of the valve is constructed so that the base 8 at the bottom of the counterbore 2 is surrounded by a circular channel 21 whereby the base 8 constitutes a pedestal which supports the inner end of the valve body 3 and is of almost the same area as the inner end of the valve body 3. This form of the improved metering valve is particularly adapted for those cases wherein the passages 9 and 10 intersect the counterbore 2 in angularly spaced relation about the axis of the bore 2. In other words the passages 9 and 10 lie in different planes about the axis of the bore 2 so that they cannot conveniently be connected by the side wall groove 20. In such a case the circular channel 21, surrounding the base or pedestal 8 on which the valve member 3 sets, provides communication between the passage 9, by way of the groove 20, and the passage 10 for a predetermined fixed rate of fluid flow when the valve body 3 has been compressed to such an extent that it circumferentially engages the side wall of the counterbore 2.

Also as shown in FIGS. 3 and 4 the side wall groove 20 is formed to open into the bore 2 at a wider angle than in the arrangement shown in FIG. 2 and the bottom of this groove 20 is counter-grooved at a narrower angle as at 22, so as to provide in effect a groove within a groove, whereby fine adjustment of fluid flow through the grooved area may be more readily had.

The main advantages of this invention reside in the small axial dimension required for the valving member and its associated parts; in the fact that the entire valve assembly can be housed within a rather shallow bore in the body of a relatively thin walled structure; in the extremely fine adjustment of the metering function of the valve; and in the fact that a very shallow valve is provided wherein several full turns of the adjusting screw may be had to cover the full range of fluid flow adjustment.

Further advantages will be found in that the improved metering valve construction wholly obviates any necessity for adjustment of a seal or gasket, after initial assembly, to compensate for wear of moving parts and to prevent leakage of the controlled fluid; and in the fact that the improved valve is a packless valve, since the metering member of the valve is confined in a sealed chamber from which any escape of fluid, other than through the intended passages leading to and from the chamber, is impossible.

Although but two specific embodiments of this invention have been herein shown and described, it will be understood that details of the constructions shown may be altered or omitted without departing from the spirit of this invention as defined by the following claims:

We claim:

1. A metering valve comprising, a body having an aperture provided with an inwardly extending counterbore therein, a base portion in said counterbore, a shelf portion adjacent the outer end of said counterbore, a resiliently flexible cylindrical valve member in said counterbore seated on said base portion and provided with an annular flange extending over said shelf portion, means carried by said body to clamp said flange axially against said shelf portion, axially shiftable means carried by said first named means for applying axial pressure to said flexible member to expand the same radially in said counterbore, said body having a pair of axially spaced flow passages opening in the wall of said counterbore, and a side wall groove in said counterbore extending from one flow passage to the other.

2. A metering valve comprising a body having an aperture provided with an inwardly extending counterbore therein, a base portion in said counterbore, a shelf portion adjacent the outer end of said counterbore, a resiliently flexible valve body in said counterbore seated on said base portion and provided with an annular flange extending over said shelf portion, means carried by said body to clamp said flange axially upon said shelf portion, axially shiftable means carried by said first named means for applying axial pressure to said flexible member to expand the same radially in said counterbore, said body having a pair of flow passages opening in the wall of said counterbore in axially spaced relation, one of said flow passages intersecting said counterbore outwardly from said base portion and the other flow passage intersecting said counterbore adjacent said base portion, a side wall groove extending axially of said counterbore from said one flow passage to said base portion, and a circular channel surrounding said base portion to provide communication between said other flow passage and the said side wall groove.

3. A metering valve construction comprising a body having an aperture provided with an inwardly extending counterbore therein, a base portion in said counterbore, a shelf portion adjacent the outer end of said counterbore, a solid cylindrical valve member of resilient compressibly expansible material disposed in said counterbore and seated endwise on said base portion, said valve of greater length than said counterbore and having an annular radial flange extending over said shelf portion, said flange being joined to said valve member by an annular axially outwardly inclined flexible web, collar means carried by said body to clamp said flange axially upon said shelf portion, means carried by said collar means for applying axial pressure to the outer end of said valve member to expand said valve member radially in said counterbore, said body having a pair of flow passages opening in the wall of said counterbore in axially spaced relation, one of said passages intersecting said counterbore outwardly from said base portion and the other of said flow passages intersecting said counterbore adjacent said base portion, a side wall groove in said counterbore extending axially thereof from said one flow passage to said base portion, and a circular channel surrounding said base portion to provide communication between said other flow passage and said side wall groove.

References Cited in the file of this patent

UNITED STATES PATENTS

| | | |
|---|---|---|
| 1,521,081 | Dooling | Dec. 30, 1924 |
| 2,348,083 | McCabe | May 2, 1944 |
| 2,449,481 | Hufferd | Sept. 14, 1948 |

FOREIGN PATENTS

| | | |
|---|---|---|
| 27,678 | Great Britain | of 1912 |
| 512,588 | Belgium | of 1952 |
| 160,913 | Australia | of 1955 |